US011996041B2

(12) United States Patent
Ka et al.

(10) Patent No.: US 11,996,041 B2
(45) **Date of Patent: *May 28, 2024**

(54) PIXEL WITH LED AND N-TYPE THIN FILM TRANSISTORS

(71) Applicant: Samsung Display Co., Ltd., Yongin-si (KR)

(72) Inventors: Ji Hyun Ka, Yongin-si (KR); Won Kyu Kwak, Yongin-si (KR); Han Sung Bae, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/460,474

(22) Filed: Aug. 30, 2021

(65) Prior Publication Data

US 2021/0390907 A1 Dec. 16, 2021

Related U.S. Application Data

(63) Continuation of application No. 16/599,890, filed on Oct. 11, 2019, now Pat. No. 11,107,400, which is a (Continued)

(30) Foreign Application Priority Data

Jul. 1, 2016 (KR) ........................ 10-2016-0083498

(51) Int. Cl.
*G09G 3/32* (2016.01)
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0861* (2013.01); (Continued)

(58) Field of Classification Search
CPC ............... G09G 3/3233; G09G 3/3266; G09G 2310/0286; G09G 2310/0291; G09G 2300/0861
See application file for complete search history.

(56) References Cited

U.S. PATENT DOCUMENTS 7,843,221 B2 11/2010 Jinta
7,903,057 B2 3/2011 Uchino et al.
(Continued)

FOREIGN PATENT DOCUMENTS

CN 101540139 9/2009
CN 101697269 4/2010
(Continued)

OTHER PUBLICATIONS

European Search Report was issued from the European Patent Office dated Oct. 23, 2017 with respect to the European Patent Application No. 17179175.9.
(Continued)

*Primary Examiner* — Liliana Cerullo
(74) *Attorney, Agent, or Firm* — KILE PARK REED & HOUTTEMAN PLLC

(57) ABSTRACT

A pixel includes a plurality of transistors and an organic light emitting diode, in which the transistors include a first transistor to control an amount of current flowing to the organic light emitting diode and additional transistors are connected to the first transistor or the organic light emitting diode, the first transistor is a Low Temperature Poly-Silicon (LTPS) thin film transistor, and one or more of the other transistors are oxide semiconductor transistors.

4 Claims, 8 Drawing Sheets

Related U.S. Application Data continuation of application No. 15/624,041, filed on Jun. 15, 2017, now Pat. No. 10,446,079.

(52) U.S. Cl.
CPC ............... *G09G 2310/0286* (2013.01); *G09G 2310/0291* (2013.01)

(56) References Cited

U.S. PATENT DOCUMENTS

| | | | | |
|---|---|---|---|---|
| 8,253,664 | B2 | 8/2012 | Shih et al. | |
| 8,654,111 | B2 | 2/2014 | Uchino et al. | |
| 9,276,050 | B2 | 3/2016 | Kwon et al. | |
| 9,373,281 | B2 | 7/2016 | Wu et al. | |
| 9,412,303 | B2 | 8/2016 | Kim et al. | |
| 9,954,202 | B2 | 4/2018 | Ishizu | |
| 10,446,079 | B2 * | 10/2019 | Ka | G09G 3/3266 |
| 11,107,400 | B2 * | 8/2021 | Ka | G09G 3/3266 |
| 2002/0101178 | A1 | 8/2002 | Park et al. | |
| 2009/0091562 | A1 | 4/2009 | Uchino et al. | |
| 2011/0084955 | A1 | 4/2011 | Kim | |
| 2012/0062528 | A1 | 3/2012 | Kimura et al. | |
| 2014/0159609 | A1 * | 6/2014 | Xie | H01L 27/3265 257/40 |
| 2014/0313180 | A1 | 10/2014 | Woo | |
| 2015/0070345 | A1 | 3/2015 | Liu | |
| 2015/0243220 | A1 | 8/2015 | Kim et al. | |
| 2015/0371589 | A1 | 12/2015 | Kim et al. | |
| 2017/0039942 | A1 * | 2/2017 | Han | G09G 3/3258 |
| 2017/0069263 | A1 | 3/2017 | Hu | |
| 2017/0186782 | A1 | 6/2017 | Lee et al. | |
| 2017/0329189 | A1 * | 11/2017 | Kim | H10K 10/482 |
| 2018/0005575 | A1 | 1/2018 | Lee et al. | |

FOREIGN PATENT DOCUMENTS

| | | |
|---|---|---|
| CN | 102800288 | 11/2012 |
| CN | 103236237 | 8/2013 |
| CN | 103474015 | 12/2013 |
| CN | 103646629 | 3/2014 |
| CN | 104112422 | 10/2014 |
| CN | 105225633 | 1/2016 |
| CN | 105612620 | 5/2016 |
| EP | 3113226 | 1/2017 |
| JP | 2008-242369 | 10/2008 |
| KR | 10-1101070 | 12/2011 |
| KR | 10-1346339 | 1/2014 |
| KR | 10-2015-0100459 | 9/2015 |
| KR | 10-2015-0100462 | 9/2015 |
| TW | 200532620 | 10/2005 |
| TW | 200834520 | 8/2008 |
| WO | 2015128920 | 9/2015 |

OTHER PUBLICATIONS

Extended European Search Report was issued from the European Patent Office dated Feb. 13, 2018 with respect to the European Patent Application No. 17179175.9.
Non-Final Office Action dated Feb. 14, 2019, issued in U.S. Appl. No. 15/624,041.
Notice of Allowance dated Jun. 4, 2019, issued in U.S. Appl. No. 15/624,041.
Office Action dated Apr. 20, 2021, issued in Japanese Patent Application No. 2017-128482.
Non-Final Office Action dated Nov. 2, 2020, issued in U.S. Appl. No. 16/599,890.
Final Office Action dated Feb. 8, 2021, issued in U.S. Appl. No. 16/599,890.
Notice of Allowance dated Apr. 19, 2021, issued in U.S. Appl. No. 16/599,890.

* cited by examiner

PIXEL WITH LED AND N-TYPE THIN FILM TRANSISTORS

CROSS-REFERENCE TO RELATED APPLICATIONS

This application is a Continuation Application of U.S. patent application Ser. No. 16/599,890, filed on Oct. 11, 2019, which is a Continuation Application of U.S. patent application Ser. No. 15/624,041, filed on Jun. 15, 2017, now issued as U.S. Pat. No. 10,446,079, each of which claims priority form and benefit of Korean Patent Application No. 10-2016-0083498, filed on Jul. 1, 2016, and each of which is hereby incorporated by reference for all purposes as if fully set forth herein.

BACKGROUND

Field

Exemplary embodiments of the invention relate generally to a pixel, a stage circuit, and an organic light emitting display device including a pixel and a stage circuit.

Discussion of the Background

A variety of displays have been developed. Examples include liquid crystal displays and organic light emitting displays. An organic light emitting display generates an image using pixels that include organic light emitting diodes. The diodes generate light based on a recombination of electrons and holes in an organic emission layer. Displays of this type have relatively high response speed and low power consumption.

The pixels of an organic light emitting display are connected to data lines and scan lines. Each pixel includes a driving transistor that regulates the amount of current flowing through an organic light emitting diode based on signals from the scan and data lines. The pixel emits light with a brightness based on the regulated amount of current.

Various attempts have been made to improve the performance of an organic light emitting display. One approach involves setting a driving power supply to a low voltage. Another approach involves driving the display at low frequency in order to reduce power consumption. However, these approaches allow current leakage to flow, for example, from the driving transistor of each pixel. As a result, the voltage of a data signal may not be maintained during one frame period. This may adversely affect brightness.

The above information disclosed in this Background section is only for understanding of the background of the inventive concepts, and, therefore, it may contain information that does not constitute prior art.

SUMMARY

Additional features of the inventive concepts will be set forth in the description which follows, and in part will be apparent from the description, or may be learned by practice of the inventive concepts.

In accordance with one or more embodiments, a pixel includes an organic light emitting diode; a first transistor to control an amount of current flowing from a first driving power supply connected to a first electrode, through the organic light emitting diode, and to a second driving power supply based on a voltage of a first node, the first transistor being an n-type Low Temperature Poly-Silicon (LTPS) thin film transistor; a second transistor connected between a data line and the first node, the second transistor to turn on when a scan signal is supplied to a first scan line, the second transistor being an n-type oxide semiconductor thin film transistor; a third transistor connected between a second electrode of the first transistor and an initialization power supply, the third transistor to turn on when a scan signal is supplied to a second scan line, the third transistor being an n-type LTPS thin film transistor; a fourth transistor connected between the first driving power supply and a first electrode of the first transistor, the fourth transistor to turn off when a light emission control signal is supplied to a light emission control line, the fourth transistor being an n-type LTPS thin film transistor; and a storage capacitor connected between a second node connected to a second electrode of the first transistor and the first node.

The pixel may include a fifth transistor connected between a reference power supply and the first node, wherein the fifth transistor is to turn on when a scan signal is supplied to a third scan line and wherein the fifth transistor is an n-type oxide semiconductor thin film transistor. The pixel may include a first capacitor connected between the first driving power supply and the second node. The second scan line may be to a first scan line in an (i−1)th horizontal line when the first scan line is in an $i^{th}$ horizontal line, where i is a natural number.

In accordance with one or more other embodiments, a stage circuit includes a buffer to connect a first input terminal or a second input terminal to an output terminal based on control of a signal generator, wherein the buffer includes a first transistor and a second transistor connected in parallel between the first input terminal and the output terminal, and a third transistor and a fourth transistor connected in parallel between the second input terminal and the output terminal, wherein the first and third transistors are n-type LTPS thin film transistors and wherein the second and fourth transistors are n-type oxide semiconductor thin film transistors. A gate electrode of the first transistor may be electrically connected to a gate electrode of the second transistor. A gate electrode of the third transistor may be electrically connected to a gate electrode of the fourth transistor.

In accordance with one or more other embodiments, an organic light emitting display device includes a plurality of pixels connected to scan lines, light emission control lines and data lines; a scan driver to drive the scan lines and the light emission control lines; and a data driver to drive the data lines, wherein at least one of the pixels includes: an organic light emitting diode; a first transistor to control an amount of current flowing from a first driving power supply connected to a first electrode, through the organic light emitting diode, and to a second driving power supply based on a voltage of a first node, wherein the first transistor is an n-type LTPS thin film transistor; a second transistor connected between a data line and the first node, the second transistor to turn on when a scan signal is supplied to a first scan line, the second transistor being an n-type oxide semiconductor thin film transistor; a third transistor connected between a second electrode of the first transistor and an initialization power supply, the third transistor to turn on when a scan signal is supplied to a second scan line, the third transistor being an n-type LTPS thin film transistor; a fourth transistor connected between the first driving power supply and a first electrode of the first transistor, the fourth transistor to turn off when a light emission control signal is supplied to a light emission control line, the fourth transistor being an n-type LTPS thin film transistor; and a storage capacitor connected between a second node coupled to a second electrode of the first transistor and the first node.

The organic light emitting display device may include a fifth transistor connected between a reference power supply and the first node, wherein the fifth transistor is to turn on when a scan signal is supplied to a third scan line and wherein the fifth transistor is an n-type oxide semiconductor thin film transistor. The pixel may include a first capacitor connected between the first driving power supply and the second node. The second scan line may be set to a first scan line located in an $(i-1)^{th}$ horizontal line when the first scan line is located in an $i^{th}$ horizontal line, where i is a natural number.

The scan driver may include a plurality of stage circuits to drive the scan lines and the light emission control lines. The at least one of the stage circuits may include a buffer connecting a first input terminal or a second input terminal to an output terminal based on control of a signal generator, wherein the buffer includes an first transistor and a second transistor connected in parallel between the first input terminal and the output terminal, and a third transistor and a fourth transistor connected in parallel between the second input terminal and the output terminal, wherein the first and third transistors are n-type LTPS thin film transistors, and wherein second and fourth transistors are n-type oxide semiconductor thin film transistors. A gate electrode of the first transistor may be electrically connected to a gate electrode of the second transistor. A gate electrode of the third transistor may be electrically connected to a gate electrode of the fourth transistor.

In accordance with one or more other embodiments, a pixel includes a first transistor; a second transistor; and an organic light emitting diode, wherein the first transistor is to control an amount of current flowing to the organic light emitting diode and wherein the first transistor is a Low Temperature Poly-Silicon (LTPS) thin film transistor and the second transistor is different from an LTPS transistor. The first and second transistors may be of a same conductivity type. The first and second transistors may be n-type transistors. The second transistor may be an oxide semiconductor transistor and may be electrically connected to a gate of the first transistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
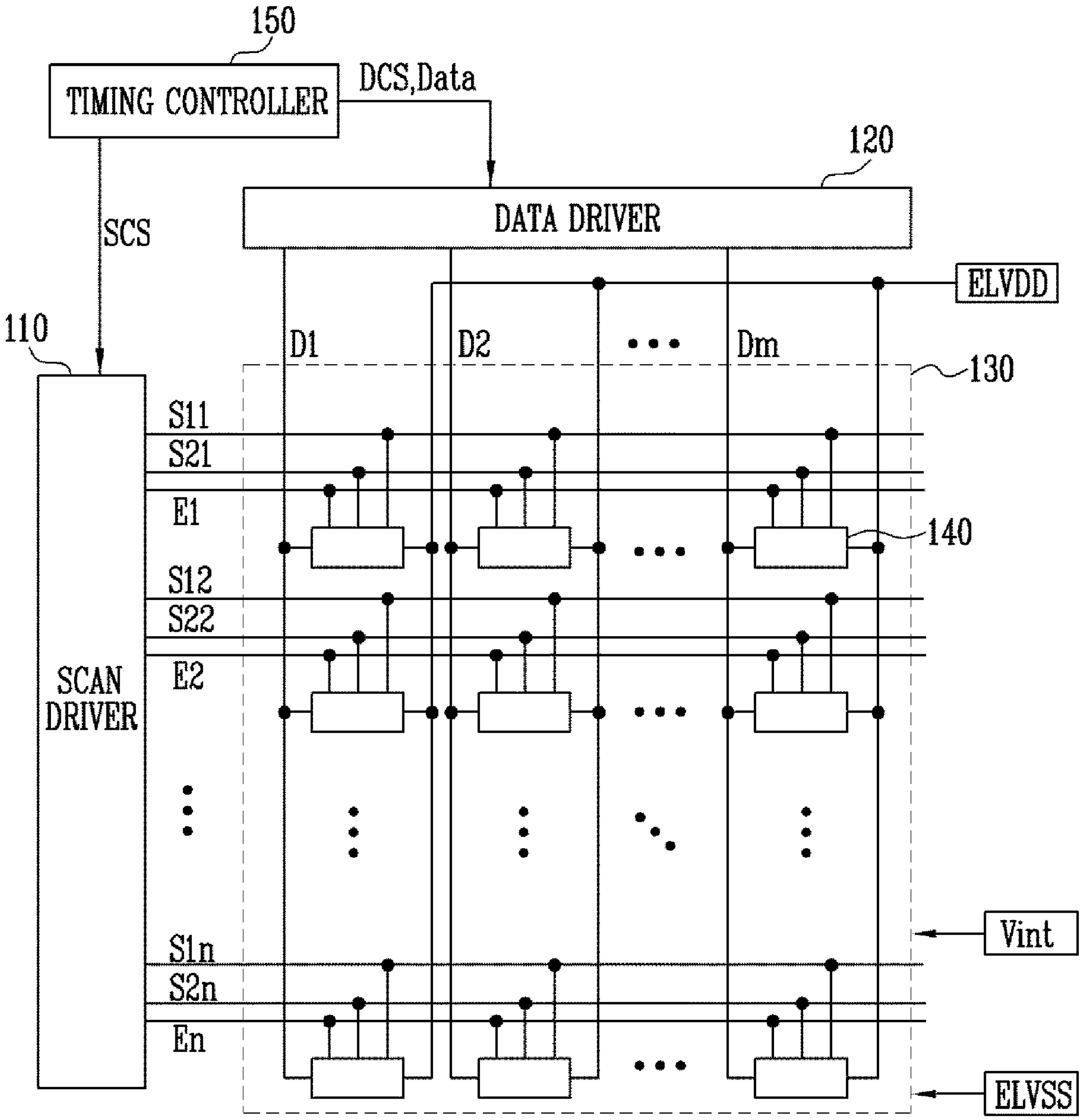
FIG. 1 illustrates an embodiment of an organic light emitting display device.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 illustrates an embodiment of an organic light emitting display device which includes pixels 140 connected to scan lines S11 to S1*n* and S21 to S2*n*, light emission control lines E1 to En, and data lines D1 to Dm, a scan driver 110 driving the scan lines S11 to S1*n* and S21 to S2*n* and the light emission control lines E1 to En, a data driver 120 driving the data lines D1 to Dm, and a timing controller 150 controlling the scan driver 110 and the data driver 120.

The timing controller 150 may generate a data driving control signal DCS and a scan driving control signal SCS based on externally supplied synchronous signals. The data driving control signal DCS and the scan driving control signal SCS generated by the timing controller 150 may be supplied to the data driver 120 and the scan driver 110, respectively. In addition, the timing controller 150 may realign and supply externally supplied data to the data driver 120.

The scan driving control signal SCS may include start pulses and clock signals. The start pulses may be applied to control the first timings of scan signals and light emission control signals. The clock signals may be applied to shift the start pulses.

The data driving control signal DCS may include a source start pulse and clock signals. The source start pulse may be applied to control a sampling start point of data and the clock signals may be applied to control a sampling operation.

The scan driver 110 may receive the scan driving control signal SCS from the timing controller 150. The scan driver 110 receiving the scan driving control signal SCS may supply scan signals to the first scan lines S11 to S1*n* and the second scan lines S21 to S2*n*. For example, the scan driver 110 may sequentially supply first scan signals to the first scan lines S11 to S1*n* and sequentially supply second scan signals to the second scan lines S21 to S2*n*. When the first scan signals are sequentially supplied, the pixels 140 may be selected in units of horizontal lines.

The scan driver 110 may supply the second scan signal to an $i^{th}$ second scan line S2*i* without overlapping with the first scan signal supplied to an $i^{th}$ first scan line S1*i*, where i is a natural number. For example, the scan driver 110 may supply the second scan signal to the $i^{th}$ second scan line S2*i* and subsequently the first scan signal to the $i^{th}$ first scan line S1*i*. Each of the first scan signal and the second scan signal may be set to a gate on voltage. For example, each of the first scan signal and the second scan signal may be set to a high voltage.

The scan driver 110 receiving the scan driving control signal SCS may supply light emission control signals to the light emission control lines E1 to En. For example, the scan driver 110 may sequentially supply the light emission control signals to the light emission control lines E1 to En. Each light emission control signal may be applied to control emission time of each pixel 140 and compensate for a threshold voltage of a driving transistor.

The light emission control signal supplied to an $i^{th}$ light emission control line Ei may be supplied to partially overlap with a period of the first scan signal supplied to the $i^{th}$ first scan line S1*i* and a period of the second scan signal supplied to the $i^{th}$ second scan line S2*i*. The light emission control signal may be set to a gate off voltage, for example, a low voltage.

In addition, the light emission control signal supplied to the $i^{th}$ light emission control line Ei may be divided into a first light emission control signal and a second light emission control signal. The first light emission control signal and the second light emission control signal may be sequentially supplied and a light emission control signal may not be supplied during a predetermined period between the first light emission control signal and the second light emission control signal. Therefore, the $i^{th}$ light emission control line Ei may be set to a gate on voltage during the predetermined period. In addition, the predetermined period may be set such that the threshold voltage of the driving transistor may be compensated, and may partially overlap with a period of the first scan signal.

The scan driver 110 may be mounted on a substrate through a thin film process. In addition, the scan driver 110 may be located at both sides with the pixel unit 130 interposed therebetween. In addition, FIG. 1 illustrates the scan driver 110 supplying the scan signals and the light emission control signals. However, in another embodiment, different drivers may supply the scan signals and the light emission control signals.

The data driver 120 may supply data signals to the data lines D1 to Dm based on the data driving control signal DCS. The data signals supplied to the data lines D1 to Dm may be supplied to the pixels 140 selected by the first scan signals. The data driver 120 may supply the data signals to the data lines D1 to Dm so as to synchronize with the first scan signals. In addition, the data driver 120 may additionally supply a voltage of a reference power supply to the data lines D1 to Dm before supplying the data signals.

The pixel unit 130 may include the pixels 140 coupled to the scan lines S11 to S1$n$ and S21 to S2$n$, the light emission control lines E1 to En, and the data lines D1 to Dm. The pixels 140 may receive a first driving power supply ELVDD, a second driving power supply ELVSS and an initialization power supply Vint from an external device.

Each of the pixels 140 may include a driving transistor and an organic light emitting diode which are not illustrated. The driving transistor may control the amount of current flowing from the first driving power supply ELVDD through the organic light emitting diode to the second driving power supply ELVSS based on a data signal. The initialization power supply Vint may be applied to compensate for the threshold voltage and set to a lower voltage than the reference power supply.

FIG. 1 illustrates n scan lines S11 to S1$n$, $n$ scan lines S21 to S2$n$ and $n$ light emission control lines E1 to En. However, in another embodiment, dummy scan lines and/or dummy light emission control lines may be additionally formed based on the circuit configuration of the pixels 140.

In addition, FIG. 1 illustrates the first scan lines S11 to S1$n$ and the second scan lines S21 to S2$n$. However, in another embodiment, third scan lines may be additionally formed based on the circuit configuration of the pixels 140.

Figure 2:
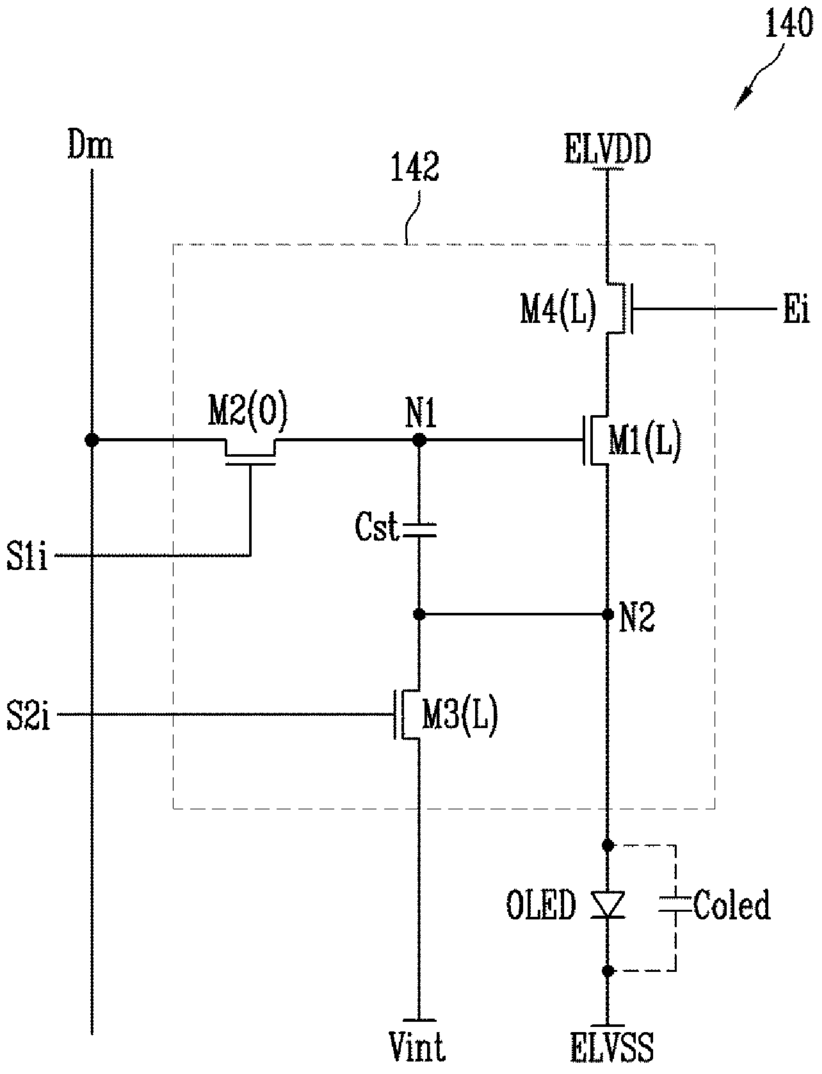
FIG. 2 illustrates an embodiment of a pixel.

FIG. 2 illustrates an embodiment of a pixel 140, which, for example, may be representative of the pixels in the display device of FIG. 1. For illustrative purposes, the pixel in FIG. 2 is one in an $i^{th}$ horizontal line and connected to an $m^{th}$ data line Dm.

Referring to FIG. 2, the pixel 140 may include an oxide semiconductor thin film transistor and a Low Temperature Poly-Silicon (LTPS) thin film transistor. The oxide semiconductor thin film transistor may include a gate electrode, a source electrode, and a drain electrode. The oxide semiconductor thin film transistor may include an active layer including an oxide semiconductor. The oxide semiconductor may be set to an amorphous or crystalline oxide semiconductor. The oxide semiconductor thin film transistor may be an n-type transistor.

The LTPS thin film transistor may include a gate electrode, a source electrode, and a drain electrode. The LTPS thin film transistor may include an active layer including polysilicon. The LTPS thin film transistor may be a p-type thin film transistor or an n-type thin film transistor. According to an embodiment, it is assumed that the LTPS thin film transistor is an n-type thin film transistor. The LTPS thin film transistor may have high electron mobility and high driving characteristics accordingly. The oxide semiconductor thin film transistor may allow for a low temperature process and have lower charge mobility than the LTPS thin film transistor. The oxide semiconductor thin film transistor may have excellent off-current characteristics.

The pixel 140 may include a pixel circuit 142 and an organic light emitting diode OLED. The organic light emitting diode OLED has an anode electrode coupled to the pixel circuit 142 and a cathode electrode coupled to the second driving power supply ELVSS. The organic light emitting diode OLED may generate light with predetermined brightness based on the amount of current supplied from the pixel circuit 142.

The pixel circuit 142 may control the amount of current flowing from the first driving power supply ELVDD, through the organic light emitting diode OLED, and to the second driving power supply ELVSS based on the data signal. The pixel circuit 142 may include a first transistor M1(L) (driving transistor), a second transistor M2(O), a third transistor M3(L), a fourth transistor M4(L) and a storage capacitor Cst.

The first transistor M1(L) has a first electrode coupled to a second electrode of the fourth transistor M4(L) and a second electrode that may pass through a second node N2 and be connected to the anode electrode of the organic light emitting diode OLED. A gate electrode of the first transistor M1(L) may be coupled to a first node N1. The first transistor M1(L) may control the amount of current flowing from the first driving power supply ELVDD, through the organic light emitting diode OLED, and to the second driving power supply ELVSS based on a voltage of the first node N1. To achieve a predetermined (e.g., high) driving speed, the first transistor M1(L) may be an n-type LTPS thin film transistor.

The second transistor M2(O) may be connected between the $m^{th}$ data line Dm and the first node N1. In addition, a gate electrode of the second transistor M2(O) may be coupled to the $i^{th}$ first scan line S1$i$. The second transistor M2(O) may be turned on when the first scan signal is supplied to the first scan line S1$i$. When the second transistor M2(O) is turned on, the data line Dm and the first node N1 may be electrically connected to each other.

When the second transistor M2(O) is an oxide semiconductor thin film transistor, the second transistor M2(O) may be an n-type thin film transistor. When the second transistor M2(O) is an oxide semiconductor thin film transistor, changes in the voltage of the first node N1 caused by current leakage may be prevented. As a result, an image with desired brightness may be displayed.

The third transistor M3(L) may be connected between the second node N2 and the initialization power supply Vint. A gate electrode of the third transistor M3(L) may be coupled to the $i^{th}$ second scan line S2$i$. The third transistor M3(L) may be turned on when the second scan signal is supplied to the second scan line S2$i$. When the third transistor M3(L) is turned on, a voltage of the initialization power supply Vint may be supplied to the second node N2. To achieve a predetermined (e.g., high) driving speed, the third transistor M3(L) may be an n-type LTPS thin film transistor.

The fourth transistor M4(L) may be coupled between the first driving power supply ELVDD and the first electrode of the first transistor M1(L). Agate electrode of the fourth transistor M4(L) may be coupled to the light emission control line Ei. The fourth transistor M4(L) may be turned off when the light emission control signal is supplied to the light emission control line Ei and may be turned on when the light emission control signal is not supplied thereto. To achieve a predetermined (e.g., high) driving speed, the fourth transistor M4(L) may be n-type LTPS thin film transistor.

The storage capacitor Cst may be coupled between the first node N1 and the second node N2. The storage capacitor Cst may store a voltage corresponding to the data signal and a threshold voltage of the first transistor M1(L).

In the above-described embodiment, the second transistor M2(O) connected to the first node N1 may be an oxide semiconductor thin film transistor. When the second transistor M2(O) is an oxide semiconductor thin film transistor, changes in the voltage of the second node N2 by current leakage may be reduced. As a result, an image with desired brightness may be displayed.

In addition, the transistors M4(L) and M1(L) located in a current supply path for supplying current to the organic light emitting diode OLED may be LTPS thin film transistors. When the transistors M4(L) and M1(L) located in the current supply path are LTPS thin film transistors, current may be stably supplied to the organic light emitting diode OLED by high driving characteristics.

Figure 3:
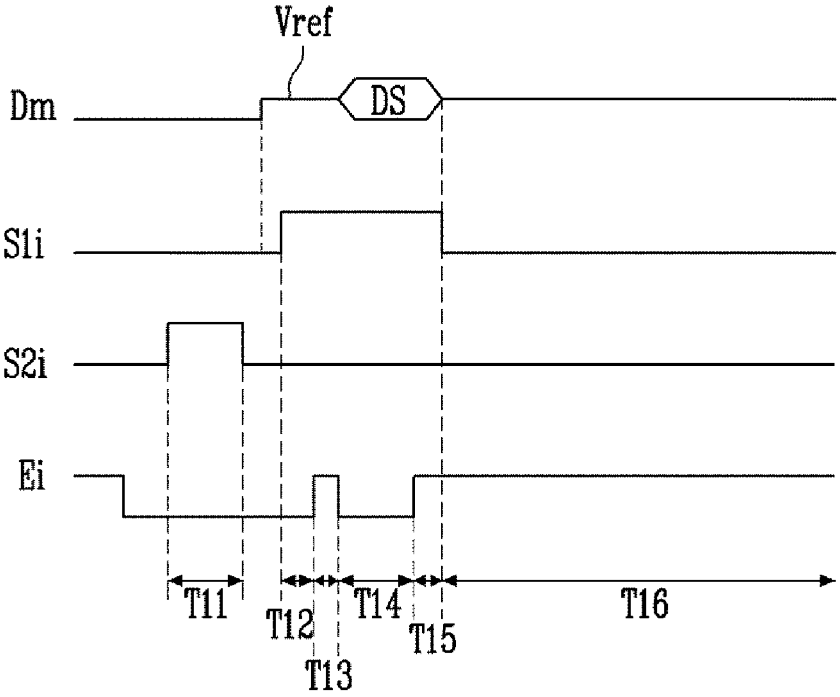
FIG. 3 illustrates an embodiment of a waveform diagram for driving a pixel.

FIG. 3 illustrates an embodiment of a method for driving a pixel, which, for example, may be pixel 140 in FIG. 2. Referring to FIG. 3, a light emission control signal (low voltage) may be supplied to the light emission control line Ei. As a result, the fourth transistor M4(L), which is an n-type transistor, may be turned off. When the fourth transistor M4(L) is turned off, electrical connection between the first driving power supply ELVDD and the first transistor M1(L) may be blocked. Therefore, during a period in which the light emission control signal is supplied to the light emission control line Ei, the pixel 140 may be set to a non-light emitting state.

The second scan signal may be supplied to the second scan line S2*i* during a first period T11. When the second scan signal is supplied to the second scan line S2*i*, the third transistor M3(L), which is an n-type transistor, may be turned on. When the third transistor M3(L) is turned on, a voltage of the initialization power supply Vint may be supplied to the second node N2. A parasitic capacitor (e.g., organic capacitor Coled) of the organic light emitting diode OLED may be discharged. The voltage of the initialization power supply Vint may be lower than a voltage obtained by adding a threshold voltage of the organic light emitting diode OLED to the second driving power supply ELVSS. After the first period T11, supply of the second scan signal to the second scan line S2*i* may be stopped to maintain the third transistor M3(L) in a turn-off state.

The first scan signal may be supplied to the first scan line S1*i* during a second period T12. When the first scan signal is supplied to the first scan line S1*i*, the second transistor M2(O), which is an n-type transistor, is turned on. When the second transistor M2(O) is turned on, the data line Dm may be electrically connected to the first node N1. A voltage of the reference power supply Vref may be supplied from the data line Dm to the first node N1. The voltage of the reference power supply Vref may turn on the first transistor M1(L). For example, a voltage (Vref−Vint) obtained by subtracting the voltage of the initialization power supply Vint from the voltage of the reference power supply Vref may be greater than the threshold voltage of the first transistor M1(L). During the second period T12, a voltage Vgs of the first transistor M1(L) may be set to the voltage Vref−Vint, which is greater than its threshold voltage.

The period in which the first scan signal is supplied to the first scan line S1*i* may be divided into the second period T12, a third period T13, a fourth period T14, and a fifth period T15. Supply of the light emission control signal to the light emission control line Ei may be stopped during the third period T13, which is between the second period T12 and the fourth period T14.

Therefore, the fourth transistor M4(L) may be temporarily turned on during the third period T13, so that a voltage of the first driving power supply ELVDD may be supplied to the first electrode of the first transistor M1(L). Since the first transistor M1(L) is set to a turn-on state, the voltage of the second node N2 may be increased by the current from the first driving power supply ELVDD.

The first node N1 may maintain the voltage of the reference power supply Vref during the third period T13. Therefore, the second node N2 may be increased to a voltage obtained by subtracting the threshold voltage of the first transistor M1(L) from the reference power supply Vref. The storage capacitor Cst may store the threshold voltage of the first transistor M1(L).

During the fourth period T14, the light emission control signal may be supplied to the light emission control line Ei to turn off the fourth transistor M4(L). A data signal DS may be supplied to the data line Dm during the fourth period T14. Since the second transistor M2(O) is set to a turn-on state during the fourth period T14, the data signal from the data line Dm may be supplied to the first node N1. The data signal supplied to the first node N1 may be stored in the storage capacitor Cst. In other words, a voltage corresponding to the data signal and the threshold voltage of the first transistor M1(L) may be stored in the storage capacitor Cst during the third period T13 and the fourth period T14.

Supply of the light emission control signal to the light emission control line Ei may be stopped during the fifth period T15. The fifth period T15 may overlap the period in which the first scan signal is supplied. Therefore, the second transistor M2(O) may be set to a turn-on state during the fifth period T15 to maintain the first node N1 at a voltage of the data signal. When the supply of the light emission control signal to the light emission control line Ei is stopped, the fourth transistor M4(L) may be turned on.

When the fourth transistor M4(L) is turned on, the first driving power supply ELVDD may be electrically connected to the first transistor M1(L). The first transistor M1(L) may be turned on, so that a predetermined current may flow through the second node N2. A voltage corresponding to current flowing from the first transistor M1(L) may be stored in capacitance (C=Cst+Coled), which is obtained by coupling the storage capacitor Cst and the organic capacitor Coled. As a result, the voltage of the second node N2 may be increased.

The increase in voltage of the second node N2 may correspond to the mobility of the first transistor M1(L) and may differ between the pixels 140. For example, according to an embodiment, the fifth period T15 may be a period during which the mobility of the first transistor M1(L) is compensated. The time allocated to the fifth period T15 may be experimentally determined to compensate for the mobility of the first transistor M1(L) in each of the pixels 140.

The supply of the first scan signal to the first scan line S1*i* may be stopped during the sixth period T16, in order to turn off the second transistor M2(O). During the sixth period T16, the first transistor M1(L) may control the amount of current flowing from the first driving power supply ELVDD, through the organic light emitting diode OLED, and to the second driving power supply ELVSS based on the voltage of the first node N1. The organic light emitting diode OLED may generate light with predetermined brightness based on the amount of current.

According to an embodiment, the second transistor M2(O) connected to the first node N1 may be an oxide semiconductor thin film transistor. As a result, current leakage from the first node N1 may be reduced, and the first node N1 may maintain a predetermined voltage during one frame period. For example, according to an embodiment, current leakage from the first node N1 may be reduced and an image with desired brightness may be displayed.

Figure 4:
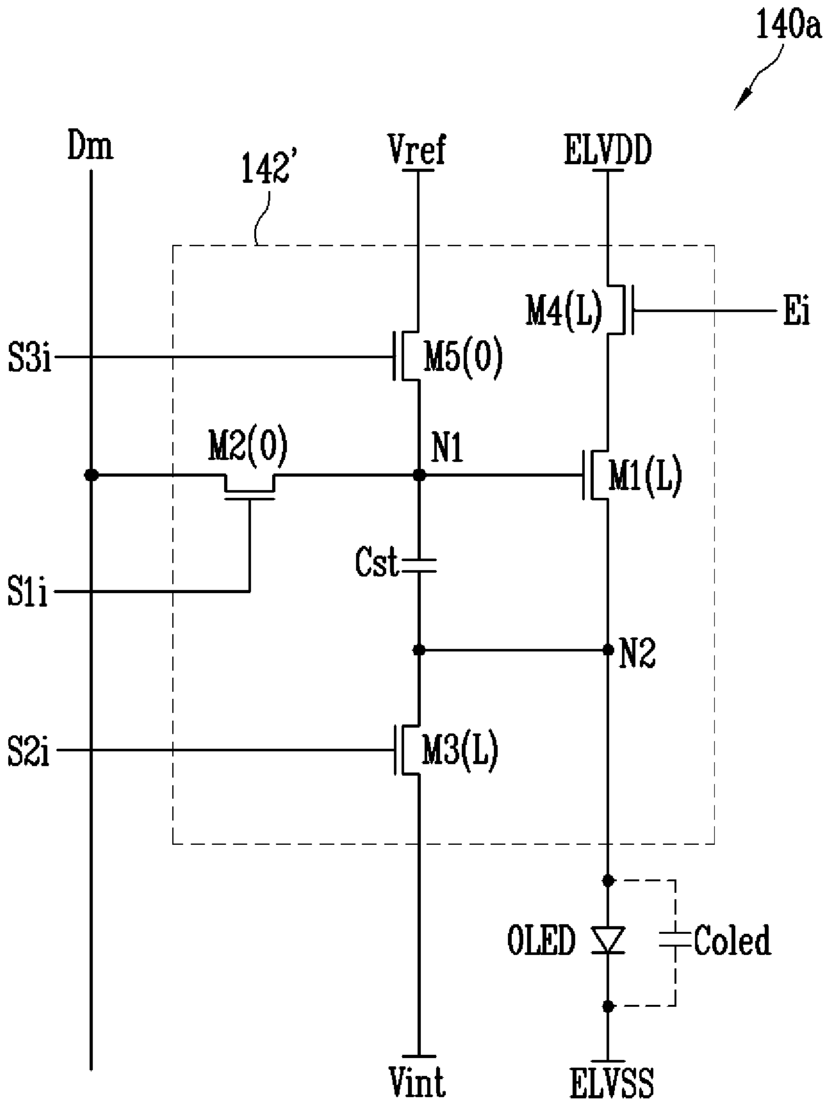
FIG. 4 illustrates another embodiment of a pixel.

FIG. 4 illustrates another embodiment of a pixel 140*a* which may include a pixel circuit 142' and the organic light emitting diode OLED. The organic light emitting diode OLED has an anode electrode which may be coupled to the pixel circuit 142' and a cathode electrode coupled to the second driving power supply ELVSS. The organic light emitting diode OLED may generate light with predetermined brightness based on the amount of current supplied from the pixel circuit 142'.

The pixel circuit 142' may include the first transistor M1(L), the second transistor M2(O), the third transistor M3(L), the fourth transistor M4(L), a fifth transistor M5(O) and the storage capacitor Cst. The pixel circuit 142' may have substantially the same configuration as the pixel circuit 142 in FIG. 2, except that the pixel circuit 142' further includes the fifth transistor M5(O). The fifth transistor M5(O) may supply the voltage of the reference power supply Vref to the first node N1. However, the reference power supply Vref may not be supplied to the data line Dm. Therefore, the data signal DS may be supplied to the data line Dm for a sufficient period of time to improve driving reliability.

The fifth transistor M5(O) may be connected between the reference power supply Vref and the first node N1. In addition, a gate electrode of the fifth transistor M5(O) may be coupled to a third scan line S3*i*. The fifth transistor M5(O) may be turned on when a third scan signal is supplied to the third scan line S3*i* and may supply the voltage of the reference power supply Vref to the first node N1.

The fifth transistor M5(O) may be an n-type oxide semiconductor thin film transistor. When the fifth transistor M5(O) is an oxide semiconductor thin film transistor, changes in voltage of the first node N1 caused by current leakage may be prevented and an image with desired brightness may be displayed.

Figure 5:
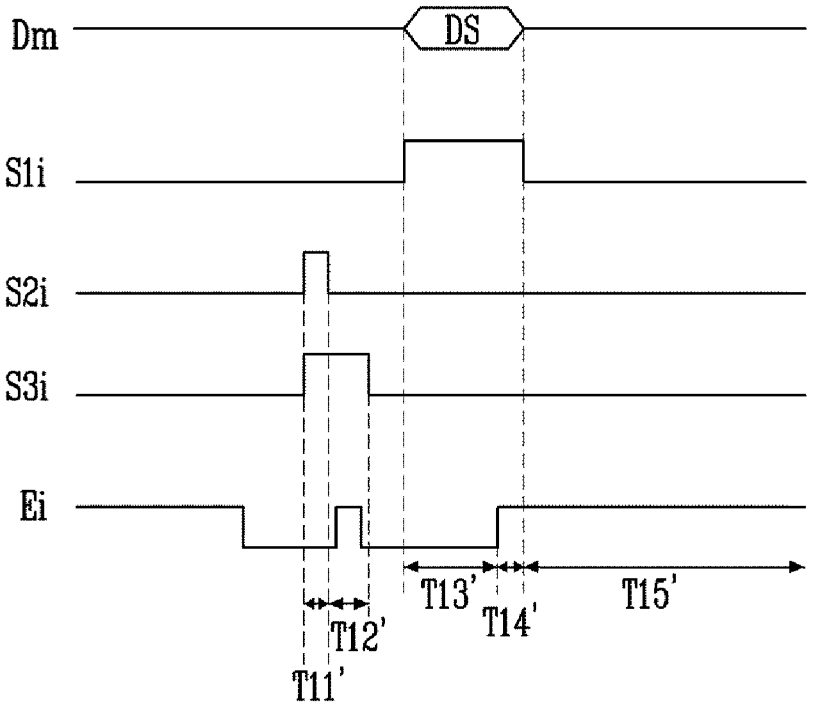
FIG. 5 illustrates another embodiment of a method for driving a pixel.

FIG. 5 illustrates an embodiment of a waveform diagram corresponding to a method for driving a pixel, which, for example, may be pixel 140*a* in FIG. 4. Referring to FIG. 5, a light emission control signal may be supplied to the light emission control line Ei to turn off the fourth transistor M4(L). When the fourth transistor M4(L) is turned off, electrical connection between the first driving power supply ELVDD and the first transistor M1(L) may be blocked. Therefore, the pixel 140 may be set to a non-light emitting state during a period in which the light emission control signal is supplied to the light emission control line Ei.

During a first period T11', a second scan signal may be supplied to the second scan line S2*i* and a third scan signal may be supplied to the third scan line S3*i*. When the second scan signal is supplied to the second scan line S2*i*, the third transistor M3(L) may be turned on. When the third transistor M3(L) is turned on, a voltage of the initialization power supply Vint may be supplied to the second node N2. The organic capacitor Coled may be discharged. When the third scan signal is supplied to the third scan line S3*i*, the fifth transistor M5(O) may be turned on. When the fifth transistor M5(O) is turned on, a voltage of the reference power supply Vref may be supplied to the first node N1.

During a second period T12', the supply of the second scan signal may be stopped and the third transistor M3(L) may be set to a turn-off state. In addition, during part of the second period T12', supply of the light emission control signal to the light emission control line Ei may be stopped.

When supply of the light emission control signal to the light emission control line Ei is stopped, the fourth transistor M4(L) may be turned on. When the fourth transistor M4(L) is turned on, a voltage of the first driving power supply ELVDD may be supplied to the first electrode of the first transistor M1(L). When a voltage of the first driving power supply ELVDD is supplied to the first electrode of the first transistor M1(L), the first transistor M1(L) may be turned on and a voltage of the second node N2 may be increased.

Since the first node N1 maintains the voltage of the reference power supply Vref, the second node N2 may be increased to a voltage obtained by subtracting a threshold voltage of the first transistor M1(L) from the reference power supply Vref. The storage capacitor Cst may store the threshold voltage of the first transistor M1(L).

The supply of the third scan signal to the third scan line S3*i* may be stopped after the second period T12'. The fifth transistor M5(O) may be turned off when the supply of the third scan signal to the third scan line S3*i* is stopped.

The first scan signal may be supplied to the first scan line S1*i* during the third period T13'. The second transistor M2(O) may be turned on when the first scan signal is supplied to the first scan line S1*i*. The data line Dm and the first node N1 may be electrically connected to each other when the second transistor M2(O) is turned on. The data signal DS from the data line Dm may be supplied to the first node N1.

The data signal supplied to the first node N1 may be stored in the storage capacitor Cst. For example, a voltage corresponding to the data signal and the threshold voltage of the first transistor M1(L) may be stored in the storage capacitor Cst during the second period T12' and the third period T13'.

Supply of the light emission control signal to the light emission control line Ei may be stopped during the fourth period T14'. The fourth transistor M4(L) may be turned on when the supply of the light emission control signal to the light emission control line Ei is stopped.

The first driving power supply ELVDD and the first transistor M1(L) may be electrically connected to each other when the fourth transistor M4(L) is turned on. A predetermined current may flow through the second node N2 when the first transistor M1(L) is turned on. A voltage corresponding to current flowing from the first transistor M1(L) may be stored in capacitance (C=Cst+Coled) by coupling the storage capacitor Cst and the organic capacitor Coled, in order to increase the voltage of the second node N2. Increasing the voltage of the second node N2 may correspond to mobility of the first transistor M1(L) and may differ between the pixels 140. As a result, the mobility of the first transistor M1(L) may be compensated. The time allocated to the fourth period T14' may be experimentally determined to compensate for the mobility of the first transistor M1(L) included in each of the pixels 140.

The supply of the first scan signal to the first scan line S1*i* may be stopped during the fifth period T15' to turn off the second transistor M2(O). The first transistor M1(L) may control the amount of current flowing from the first driving power supply ELVDD, through the organic light emitting diode OLED, and to the second driving power supply ELVSS based on the voltage of the first node N1 during the fifth period T15'. Thus, the organic light emitting diode OLED may generate light with predetermined brightness based on the amount of current.

According to an embodiment, the second transistor M2(O) and the fifth transistor M5(O) coupled to the first node N1 may be oxide semiconductor thin film transistors. Therefore, current leakage from the first node N1 may be reduced and the first node N1 may maintain a predetermined voltage during one frame period. For example, according to an embodiment, leakage current from the first node N1 may be reduced to display an image with a desired brightness.

Figure 6:
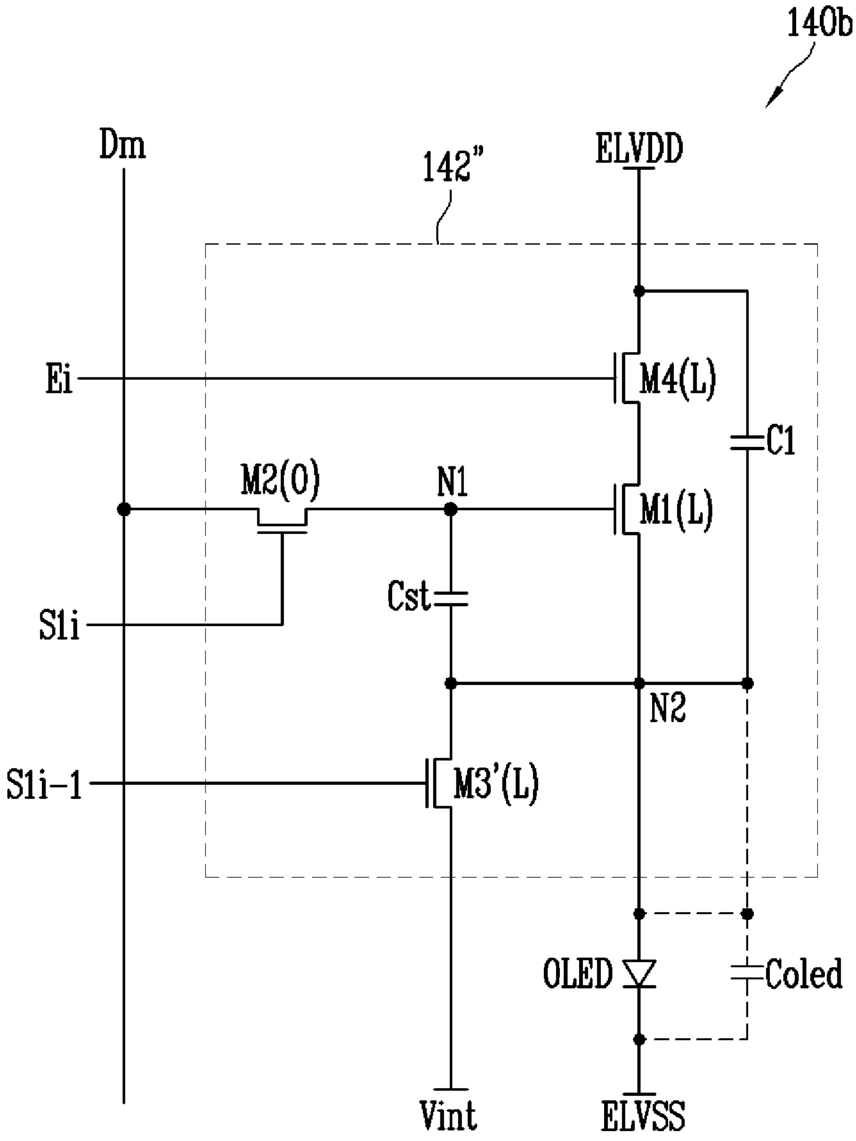
FIG. 6 illustrates another embodiment of a pixel.

FIG. 6 illustrates another embodiment of a pixel 140*b*. For illustrative purposes, pixel is 140*b* is one located in the $i^{th}$ horizontal line and the $m^{th}$ data line Dm.

Referring to FIG. 6, the pixel 140*b* may include a pixel circuit 142" and the organic light emitting diode OLED. The organic light emitting diode OLED has an anode electrode coupled to the pixel circuit 142" and a cathode electrode coupled to the second driving power supply ELVSS. The organic light emitting diode OLED may generate light with predetermined brightness based on the amount of current supplied from the pixel circuit 142".

In comparison with the pixel 140 in FIG. 2, the pixel 140 may further include a first capacitor C1 between the first driving power supply ELVDD and the second node N. The first capacitor C1 may be connected in series with the organic capacitor Coled in order to reduce capacitance of the capacitor coupled to the second node N2.

To stably maintain the voltage Vgs of the first transistor M1(L), a voltage of the second node N2 may be changed based on changes in a voltage of the first node N1.

When the pixel circuit 142" does not include the first capacitor C1, the second node N2 may be coupled to the organic capacitor Coled. The organic capacitor Coled may have a capacitance greater than the storage capacitor Cst. Therefore, changes of the voltage of the second node N2 caused by changes of the voltage of the first node N1 may be reduced. For example, when the voltage of the first node N1 is changed by 1V, the voltage of the second node N2 may be changed by 0.5V.

When the pixel circuit 142" includes the first capacitor C1, the second node N2 may be coupled to the first capacitor C1 and the organic capacitor Coled. Since the first capacitor C1 and the organic capacitor Coled are coupled in series, capacitance of the capacitor connected to the second node N2 may be reduced. Therefore, the voltage of the second node N2 may be stably changed based on the changes of the voltage of the second node N2, in order to ensure driving stability. For example, if the pixel circuit 142" includes the first capacitor C1, the voltage of the second node N2 may be changed by 0.8V, which is greater than 0.5V when the voltage of first node N1 is changed by 1V.

In some embodiments, the first capacitor C1 may be in each of the pixel circuits 142 and 142' in FIGS. 2 and 4, respectively. According to another embodiment, the gate electrode of the third transistor M3(L) may be connected to an $(i-1)^{th}$ first scan line S1*i*−1. The second scan line S2*i* may be removed from the pixel circuit 142 in FIG. 2.

Figure 7:
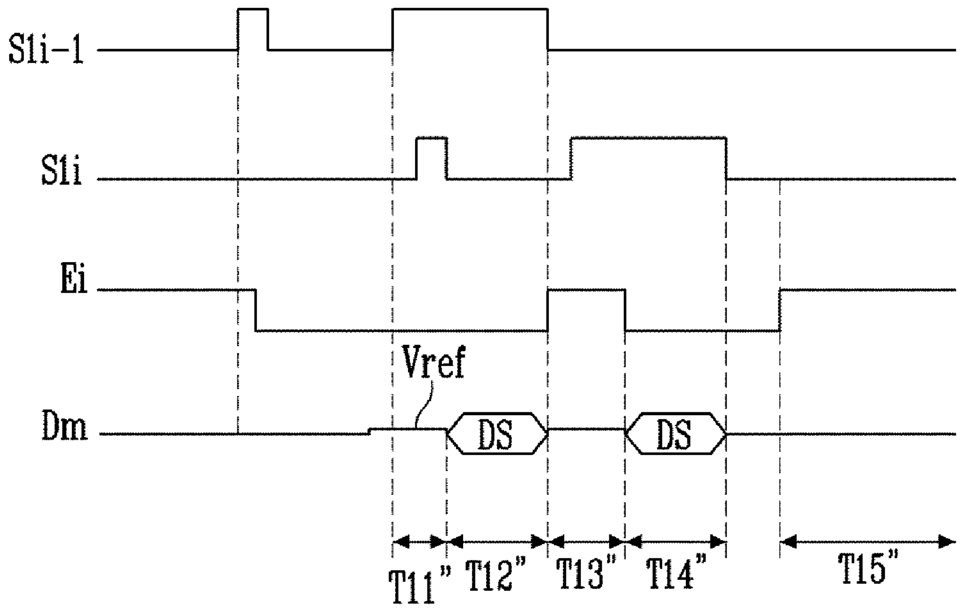
FIG. 7 illustrates another embodiment of a waveform diagram for driving a pixel.

FIG. 7 illustrates another embodiment of a method for driving a pixel, which, for example, may be pixel 140*b* in FIG. 6. For illustrative purposes, only data signals corresponding to an $(i-1)^{th}$ horizontal line and the $i^{th}$ horizontal line are illustrated.

Referring to FIG. 7, two scan signals (e.g., a first scan signal and a second scan signal) may be sequentially supplied to the first scan line S1 at a predetermined period. The second scan signal supplied to the $(i-1)^{th}$ first scan line S1*i*−1 may overlap the first scan signal supplied to the $i^{th}$ first scan line S1*i*.

For example, a light emission control signal may be supplied to the light emission control line Ei to turn off the fourth transistor M4(L). When the fourth transistor M4(L) is turned off, electrical connection between the first driving power supply ELVDD and the first transistor M1(L) may be blocked. Therefore, the pixel 140*b* may be set to a non-light emitting state during the period when the light emission control signal is supplied to the light emission control line Ei.

During a first period T11", the second scan signal may be supplied to the $(i-1)^{th}$ first scan line S1*i*−1 and the first scan signal may be supplied to the $i^{th}$ first scan line S1*i*. When the second scan signal is supplied to the $(i-1)^{th}$ first scan line S1*i*−1, the third transistor M3'(L) may be turned on. When the third transistor M3'(L) is turned on, a voltage of the initialization power supply Vint may be supplied to the second node N2.

When the first scan signal is supplied to the $i^{th}$ first scan line S1*i*, the second transistor M2(O) may be turned on. When the second transistor (M2) is turned on, a voltage of the reference power supply Vref from the data line Dm may be supplied to the first node N1.

Subsequently, supply of the first scan signal to the $i^{th}$ first scan line S1*i* may be stopped during a second period T12" to turn off the second transistor M2(O). The third transistor M3'(L) may maintain the turn-on state by the second scan signal supplied to the $(i-1)^{th}$ first scan line S1*i*−1. As a result, the second node N2 may maintain a voltage of the initialization power supply Vint. In addition, since a voltage of the second node N2 is not changed during the second period T12", the first node N1 set to a floating state may maintain the voltage of the reference power supply Vref.

During a third period T13", supply of the light emission control signal to the light emission control line Ei may be stopped and the second scan signal may be supplied to the $i^{th}$ first scan line S1*i*. When the second scan signal is supplied to the $i^{th}$ first scan line S1*i*, the second transistor M2(O) may be turned on. When the second transistor M2(O) is turned on, the data line Dm may be electrically connected to the first node N1. The voltage of the reference power supply Vref from the data line Dm may be supplied to the first node N1.

When supply of the light emission control signal to the light emission control line Ei is stopped, the fourth transistor M4(L) may be turned on. When the fourth transistor M4(L) is turned on, a voltage of the first driving power supply ELVDD may be supplied to the first electrode of the first transistor M1(L). When the voltage of the first driving power supply ELVDD is supplied to the first electrode of the first transistor M1(L), the first transistor M1(L) may be turned on to increase the voltage of the second node N2.

The first node N1 may maintain the voltage of the reference power supply Vref during the third period T13". Therefore, the second node N2 may be increased to a voltage obtained by subtracting the threshold voltage of the first transistor M1(L) from the reference power supply Vref. The threshold voltage of the first transistor M1(L) may be stored in the storage capacitor Cst.

During a fourth period T14", the light emission control signal may be supplied to the light emission control line Ei to turn off the fourth transistor M4(L). The data signal DS may be supplied to the data line Dm during the fourth period T14". Since the second transistor M2(O) is set to a turn-on state during the fourth period T14", the data signal from the data line Dm may be supplied to the first node N1. The data signal supplied to the first node N1 may be stored in the storage capacitor Cst. For example, the storage capacitor Cst may store a voltage corresponding to the data signal and the threshold voltage of the first transistor M1(L) during the third period T13" and the fourth period T14".

Supply of the light emission control signal to the light emission control line Ei may be stopped during a fifth period T15". The fourth transistor M4(L) may be turned on when the supply of the light emission control signal to the light emission control line Ei is stopped. When the fourth transistor M4(L) is turned on, the first driving power supply ELVDD may be electrically connected to the first transistor M1(L). The first transistor M1(L) may control the amount of current flowing from the first driving power supply ELVDD, through the organic light emitting diode OLED, and to the second driving power supply ELVSS based on the voltage of the first node N1. The organic light emitting diode OLED may generate light with predetermined brightness based on the amount of current.

According to an embodiment, the second transistor M2(O) coupled to the first node N1 may be an oxide semiconductor thin film transistor. As a result, current leakage from the first node N1 may be reduced and the first node N1 may maintain a predetermined voltage during one frame period. For example, according to an embodiment, current leakage from the first node N1 may be reduced and an image with desired brightness may be displayed.

The scan driver 110 may include a plurality of stage circuits to generate scan and light emission control signals. Each stage circuit may include a signal generator to generate a signal (scan signal and/or light emission control signal) and a buffer.

Figure 8:
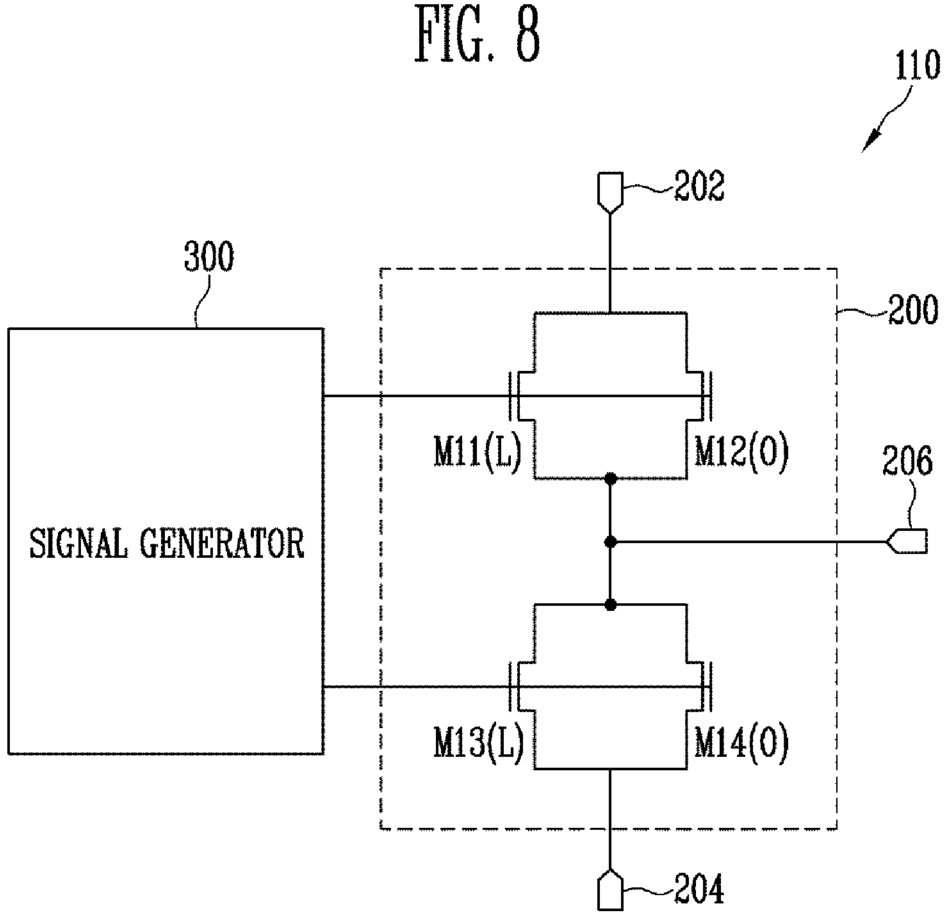
FIG. 8 illustrates an embodiment of a stage circuit.

FIG. 8 illustrates an embodiment of a stage circuit which may include a signal generator 300 and a buffer 200. The signal generator 300 may control the buffer 200, for example, based on clock signals and a start pulse. The buffer 200 may electrically connect a first input terminal 202 or a second input terminal 204 to an output terminal 206 based on control of the signal generator 300. The buffer 200 may include an eleventh transistor M11(L), a twelfth transistor M12(O), a thirteenth transistor M13(L) and a fourteenth transistor M14(O).

The eleventh transistor M11(L) and the twelfth transistor M12(O) may be connected in parallel between the first input terminal 202 and the output terminal 206. Gate electrodes of the eleventh transistor M11(L) may be electrically connected to the twelfth transistor M12(O).

The eleventh transistor M11(L) and the twelfth transistor M12(O) may be turned on or off at the same time to control electrical connection between the first input terminal 202 and the output terminal 206. Driving reliability may be ensured by controlling electrical connection between the first input terminal 202 and the output terminal 206 using the eleventh transistor M11(L) and the twelfth transistor M12(O), connected in parallel between the first input terminal 202 and the output terminal 206.

The eleventh transistor M11(L) may be an n-type LTPS thin film transistor and the twelfth transistor M12(O) may be an n-type oxide semiconductor thin film transistor. The LTPS thin film transistor may have a top-gate structure and the oxide semiconductor thin film transistor may have a bottom-gate structure.

During manufacturing processes, the eleventh transistor M11(L) and the twelfth transistor M12(O) may at least partially overlap each other. For example, at least one of the gate electrode, a source electrode, or a drain electrode of the eleventh transistor M11(L) may overlap at least one of the gate electrode, a source electrode, or a drain electrode of the twelfth transistor M12(O). When the eleventh transistor M11(L) and the twelfth transistor M12(O) overlap each other, the mounting area of the buffer 200 may be reduced and, therefore, dead space may be reduced.

The thirteenth transistor M13(L) and the fourteenth transistor M14(O) may be connected in parallel between the output terminal 206 and the second input terminal 204. In addition, gate electrodes of the thirteenth transistor M13(L) may be electrically connected to the fourteenth transistor M14(O).

The thirteenth transistor M13(L) and the fourteenth transistor M14(O) may be turned on or off at the same time to control electrical connection between the second input terminal 204 and the output terminal 206. Driving reliability may be ensured by controlling electrical connection between the second input terminal 204 and the output terminal 206 using the thirteenth transistor M13(L) and the fourteenth transistor M14(O) connected in parallel between the second input terminal 204 and the output terminal 206.

In addition, the thirteenth transistor M13(L) may be an n-type LTPS thin film transistor and the fourteenth transistor M14(O) may be an n-type oxide semiconductor thin film transistor. The LTPS thin film transistor may have a top-gate structure and the oxide semiconductor thin film transistor may have a bottom-gate structure.

During manufacturing processes, the thirteenth transistor M13(L) and the fourteenth transistor M14(O) may at least partially overlap each other. For example, at least one of the gate electrode, a source electrode, and a drain electrode of the thirteenth transistor M13(L) may overlap at least one of the gate electrode, a source electrode, and a drain electrode of the fourteenth transistor M14(O). When the thirteenth transistor M13(L) and the fourteenth transistor M14(O) overlap each other, the mounting area of the buffer 200 may be reduced and, therefore, dead space may be reduced.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The drivers, generators, and other processing features of the embodiments disclosed herein may be implemented in logic which, for example, may include hardware, software, or both. When implemented at least partially in hardware, the drivers, generators, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the drivers, generators, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with one or more of the aforementioned embodiments, a pixel may include an oxide semiconductor thin film transistor and an LTPS thin film transistor. The oxide semiconductor thin film transistor, which may have excellent off-characteristics, may be located in a current leakage path. As a result, current leakage may be reduced and an image with desired brightness may be displayed.

In addition, the LTPS thin film transistor having excellent driving characteristics may be located in a current supply path for supplying current to an organic light emitting diode. As a result, current may be stably supplied to an organic light emitting diode by rapid driving characteristics of the LTPS thin film transistor. In addition, a buffer may include an oxide semiconductor thin film transistor and an LTPS thin film transistor. This may improve driving characteristics and, at the same time, reduce the size of a mounting area for the buffer.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A pixel, comprising:

a first transistor having a gate electrode connected to a first node;

a second transistor connected between a data line and the gate electrode of the first transistor, the second transistor having a gate electrode connected to a first scan line;

a third transistor connected between a second electrode of the first transistor and an initialization power supply, the third transistor having a gate electrode connected to a second scan line different from the first scan line;

a fourth transistor having a first electrode connected to a reference power supply and a second electrode connected to the first node, the fourth transistor having a gate electrode connected to a third scan line different from the first scan line and the second scan line;

a first capacitor connected between a first driving power supply and the second electrode of the first transistor;

a light emitting diode connected to the third transistor and a second driving power supply different from the initialization power supply; and a parasitic capacitor of the light emitting diode, the parasitic capacitor connected between the first capacitor and the second driving power supply, wherein the first transistor is to control an amount of current flowing from the first driving power supply to the light emitting diode, and wherein the first capacitor and the parasitic capacitor are connected in series.

2. The pixel as claimed in claim 1, wherein the first and second transistors are of a same conductivity type.

3. The pixel as claimed in claim 2, wherein the first and second transistors are n-type transistors.

4. The pixel as claimed in claim 2, wherein the second transistor is an oxide semiconductor thin film transistor.

* * * * *